US012769779B2

(12) United States Patent
Madasu et al.

(10) Patent No.: US 12,769,779 B2
(45) Date of Patent: Oct. 20, 2026

(54) FALLOUT EVALUATION IN AN INFORMATION SYSTEM

(71) Applicant: INTERNATIONAL BUSINESS MACHINES CORPORATION, Armonk, NY (US)

(72) Inventors: Srinath Madasu, Houston, TX (US); William Chang, Burlingame, CA (US); Jean Pommier, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/655,211

(22) Filed: May 3, 2024

(65) Prior Publication Data

US 2025/0342193 A1 Nov. 6, 2025

(51) Int. Cl.
*G06F 16/35* (2025.01)

(52) U.S. Cl.
CPC .................................... *G06F 16/35* (2019.01)

(58) Field of Classification Search
CPC ........... G06F 16/35; G06F 16/34; G06F 16/30
See application file for complete search history.

(56) References Cited

U.S. PATENT DOCUMENTS 7,600,160 B1 * 10/2009 Lovy .................. G06F 11/3495
714/57
8,407,081 B1 3/2013 Rajasenan
9,324,038 B2 4/2016 Charif
9,967,188 B2 * 5/2018 Kanonakis .......... H04L 47/2441
10,440,591 B2 * 10/2019 Lee ....................... H04W 88/10
10,554,547 B2 * 2/2020 Thirumurthi ....... H04L 61/2514
10,812,319 B1 * 10/2020 Prakash ................ H04L 41/046
10,831,470 B2 * 11/2020 Regmi .................... G06F 8/656
11,102,236 B2 * 8/2021 Shurtleff ............. G06F 11/3013
11,200,133 B1 * 12/2021 A ........................ G06F 11/3006
11,201,881 B2 * 12/2021 Janakiraman ......... H04L 67/306
11,263,544 B2 * 3/2022 Livny .................... G06N 20/00
2013/0103827 A1 * 4/2013 Dunlap ............... H04L 47/2441
709/224
2018/0013776 A1 * 1/2018 Gay ....................... G06N 20/00
2018/0331946 A1 * 11/2018 Olofsson ................ H04L 45/22
(Continued)

OTHER PUBLICATIONS

Automate Order Fallout Resolution Using Self-Healing Framework, downloaded from https://cloudtweaks.com/2021/03/automate-order-fallout-resolution-using-self-healing-framework, Feb. 9, 2024, 3 pgs.

(Continued)

*Primary Examiner* — Miranda Le
(74) *Attorney, Agent, or Firm* — CHIP LAW GROUP

(57) ABSTRACT

A method that includes receiving information system tickets, generating for each information system ticket a first state of data to capture an original state of one or more end-user operational data, generating for each information system ticket a second state of data to capture a changed state of the one or more end-user operational data, storing the first state and the second state in a database, and mining the database for changes in end-user operational data between the first state and the second state to generate patterns of changes. The patterns of changes are clustered into a number of clusters with each cluster representing a different ticketing issue.

13 Claims, 7 Drawing Sheets

(56) References Cited

U.S. PATENT DOCUMENTS

| | | | | |
|---|---|---|---|---|
| 2019/0199611 | A1* | 6/2019 | Kotadia | H04L 43/12 |
| 2019/0318204 | A1 | 10/2019 | Mishra | |
| 2019/0339965 | A1* | 11/2019 | Garvey | G06F 16/24578 |
| 2020/0322443 | A1* | 10/2020 | Ciabarra, Jr. | G06F 16/1752 |
| 2020/0382389 | A1* | 12/2020 | Bellini, III | H04L 41/40 |
| 2020/0382430 | A1* | 12/2020 | Hughes | H04L 41/40 |
| 2021/0092068 | A1* | 3/2021 | Ismailsheriff | H04L 47/27 |
| 2021/0397497 | A1* | 12/2021 | Tiwari | G06N 20/00 |
| 2021/0409275 | A1* | 12/2021 | Galchenko | H04L 43/08 |
| 2022/0353146 | A1* | 11/2022 | Sigoure | H04L 41/0856 |
| 2024/0283809 | A1* | 8/2024 | Sinha | H04L 63/1433 |

OTHER PUBLICATIONS

Bernard, G. et al., "A Process Mining Based Model for Customer Journey Mapping," In Forum and doctoral consortium papers presented at the 29th International Conference on Advanced Information Systems Engineering (CAiSE 2017), vol. 1848, pp. 49-56. CEUR Workshop Proceedings, 2017.

Issahaku, F. Y. et al., "A Novel Process of Parsing Event-Log Activities for Process Mining Based on Information Content," Electronics (2023), vol. 12, https://www.mdpi.com/2079-9292/12/2/289, 34 pgs.

Tolciu, D. et al., "Analysis of patterns and similarities in service tickets using natural language processing", Journal of Communications Software and Systems (2021). vol. 17:1, pp. 29-35.

Mitsyuk, A. et al., "Using process mining for the analysis of an e-trade system: A case study", Data Analysis and Intellectual Systems (2014), vol. 3 (29), pp. 15-27.

Paramesh, S.P. et al., "Classifying the unstructured IT service desk tickets using ensemble of classifiers", In 2018 3rd International Conference on Computational Systems and Information Technology for Sustainable Solutions (CSITSS), pp. 221-227. IEEE, 2018.

Subbarao, M. V. et al., "Automation of incident response and IT ticket management by ML and NLP mechanisms", Journal of Theoretical and Applied Information Technology (2000), vol. 100:12, pp. 3945-3955.

* cited by examiner

TIME →

| TICKETING ISSUE 406 | NUMBER OF OCCURRENCES 604 | | |
|---|---|---|---|
| | FIRST TIME PERIOD 606 | THIRD TIME PERIOD 608 | THIRD TIME PERIOD 608 |
| TICKETING ISSUE 1 406-1 | 300 | 130 | 0 |
| TICKETING ISSUE 2 406-2 | 45 | 38 | 1 |
| TICKETING ISSUE 3 406-3 | 52 | 87 | 0 |
| NEW TICKETING ISSUE 406-4 | 1 | 50 | 375 |

TICKETING OVERVIEW 602

FIG. 6

FALLOUT EVALUATION IN AN INFORMATION SYSTEM

BACKGROUND

Technical Field

The present disclosure generally relates to evaluating fallouts in an information system, and more particularly, to a method and system of clustering information about end-user operational data for early fallout pattern recognition using unsupervised learning in an information system.

Description of the Related Art

In the realm of organizational operations, process analysis is a salient step in understanding areas where improvements in an information system may be needed. The analysis enables entities to scrutinize, evaluate, and refine fundamental structures and procedures. The information systems typically employ ticketing mechanisms to track and prioritize items, ensuring timely resolution and effective resource allocation.

However, conventional ticket data management systems often encounter challenges associated with repetitive and/or new tasks. These tasks may involve addressing recurring incidents, requests, or issues that necessitate similar resolutions or follow-up actions or completely new data friction challenges. Such redundancy and discovery process not only consumes valuable resources but also hampers operational efficiency and user satisfaction.

BRIEF SUMMARY

According to an embodiment of the present disclosure, a method includes generating for each information system ticket of a plurality of information system tickets a first state of data to capture an original state of one or more end-user operational data, generating for each information system ticket a second state of data to capture a changed state of the one or more end-user operational data, storing the first state and the second state in a database, and mining the database for changes in end-user operational data between the first state and the second state to generate patterns of changes. The patterns of changes are clustered into a number of clusters with each cluster representing a different ticketing issue.

In one embodiment, information about an existing ticket is inferred based on successfully assigning a pattern of operational data changes related to the existing ticket to an existing cluster from the plurality of clusters.

In one embodiment, a new pattern of ticketing issues is detected by assigning a new pattern of operational data changes related to a new ticket to a new cluster responsive to determining that the new pattern of operational data changes does not fit into any of the plurality of clusters.

According to an embodiment of the present disclosure, a computer program product includes one or more computer-readable storage devices and program instructions stored on at least one of the one or more computer-readable storage devices, the program instructions executable by a processor, the program instructions including program instructions to generate, for each information system ticket of a plurality of information system tickets, a first state of data, corresponding to at least an original state of one or more end-user operational data. The program instructions generate, for each information system ticket of the plurality of information system tickets, a second state of data, corresponding to at least a changed state of the one or more end-user operational data. The program instructions store the first state and the second state of data of the plurality of information system tickets in a database, and mine the database for changes in the one or more end-user operational data between the first state and the second state to generate patterns of changes, responsive to which the program instructions can cluster the patterns of changes into a plurality of clusters wherein each cluster represents a different ticketing issue.

According to an embodiment of the present disclosure, a non-transitory computer readable storage medium tangibly embodying a computer readable program code having computer readable instructions that, when executed, causes a computer system to generate, for each information system ticket of a plurality of information system tickets a first state of data, corresponding to at least an original state of one or more end-user operational data. The execution of the non-transitory computer readable storage medium causes the computer system to generate, for each information system ticket of the plurality of information system tickets a second state of data, corresponding to at least a changed state of the one or more end-user operational data. The non-transitory computer readable storage medium causes the computer system to store the first state and the second state of data of the plurality of information system tickets in a database, and mine the database, for changes in the one or more end-user operational data between the first state and the second state to generate patterns of changes, responsive to which the patterns of changes can be clustered into a plurality of clusters with each cluster representing a different ticketing issue.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 6 depicts a block diagram showing a ticketing overview in accordance with an illustrative embodiment.

DETAILED DESCRIPTION

Overview

Figure 1:
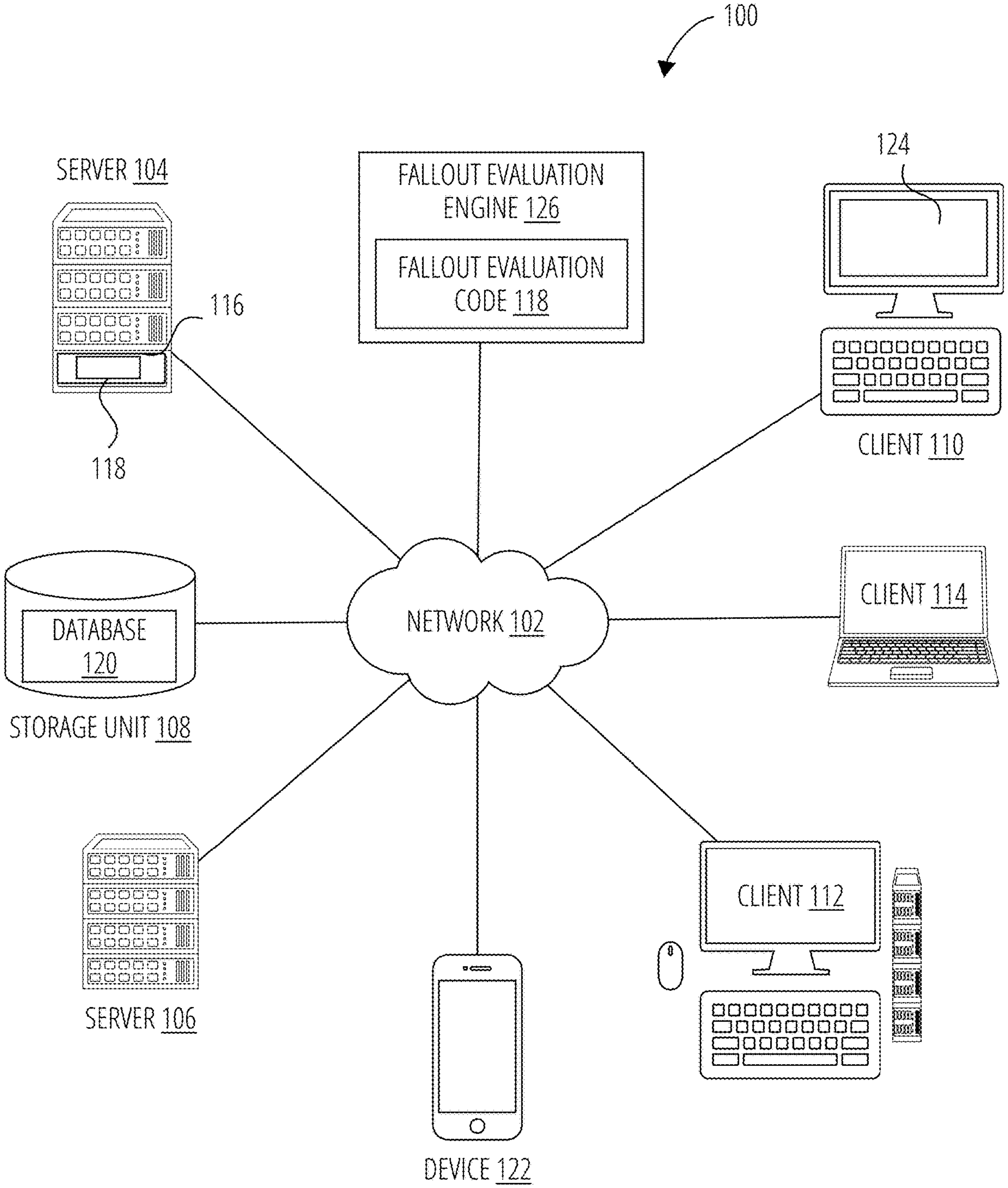
FIG. 1 depicts a block diagram of a network of data processing systems in accordance with an illustrative embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Embodiments of the present disclosure relate to the field of computing, and more specifically to clustering information about end-user operational data for early fallout pattern recognition. The following described exemplary embodiments provide a system, method, and program product to, among other things, detect data updates or changes in an information system and infer information about one or more issues that necessitated the update or change. Therefore, the present embodiment has the capacity to improve the technical field of ticketing, escalation, and fallout services in computer systems by data mining the updates or changes for state instances that triggered the creation of tickets to infer information about the tickets without relying on manual inputs from an operator that resolved the ticket.

As used herein, the terms end-user operational data, operational data, end-user application data and the like may refer to data used by an operator or end-user of an application in normal operations of the end-user. More specifically, these may be non-technical information utilized by an organization in its daily activities, distinct from data used by an Information Technology or specialized firm providing services to the organization. This type of data is integral to the core functions of the organization and supports its day-to-day activities. Examples of end-user operation data may include, for example, internet speeds, protocols for file transfer (e.g., File Transfer Protocol, Hypertext Transfer Protocol Secure), addresses, phone numbers, surveys and other information directly relevant to the organization's operations, decision-making processes, and strategic planning. In contrast, technical data may be, for example, timestamps, and system logs, that are typically used by IT professionals for troubleshooting, maintenance, and optimization purposes and may not directly impact the organization's operational decisions or processes. Focus on end-user operational data may obviate the use of technical ticketing information that may be unmanageable and unintuitive to maneuver.

According to an aspect of the present disclosure, a method includes receiving information system tickets and generating for each information system ticket a first state of data to capture an original state of one or more end-user operational data, generating for each information system ticket a second state of data to capture a changed state of the one or more end-user operational data, storing the first state and the second state in a database, and mining the database for changes in end-user operational data between the first state and the second state to generate patterns of changes. The patterns of changes are clustered into a number of clusters with each cluster representing a different ticketing issue. This offers a machine learning based solution to improve the efficiency of ticketing processes wherein data issues that lead to the creation of fallouts and escalations may be proactively and preemptively detected and fixed to avoid the creation of costly tickets.

In the following detailed description, numerous specific details are set forth by way of examples in order to provide a thorough understanding of the relevant teachings. However, it should be apparent that the present teachings may be practiced without such details. In other instances, well-known methods, procedures, and components have been described at a relatively high-level, without detail, in order to avoid unnecessarily obscuring aspects of the present teachings.

Certain operations are described as occurring at a certain component or location in an embodiment. Such locality of operations is not intended to be limiting on the illustrative embodiments. Any operation described herein as occurring at or performed by a particular component, can be implemented in such a manner that one component-specific function causes an operation to occur or be performed at another component, e.g., at a local or remote engine respectively. In one aspect, the method described herein, is implemented to execute on a particularly configured computing device or data processing system and provides substantial advancement of the functionality of that computing device or data processing system by enabling the use of Large Language Models and Natural Language Inputs. Embodiments thus have the capacity to improve the technical field of UI automation by generalizing the process of UI automation targeting the specific needs of non-technical users.

Importantly, although the operational/functional descriptions described herein may be understandable by the human mind, they are not abstract ideas of the operations/functions divorced from computational implementation of those operations/functions. Rather, the operations/functions represent a specification for an appropriately configured computing device. As discussed in detail below, the operational/functional language is to be read in its proper technological context, i.e., as concrete specifications for physical implementations.

It should be appreciated that aspects of the teachings herein are beyond the capability of a human mind. It should also be appreciated that the various embodiments of the subject disclosure described herein can include information that is impossible to obtain manually by an entity, such as a human user. For example, the type, amount, and/or variety of information included in performing the process discussed herein can be more complex than information that could be reasonably processed manually by a human user.

The illustrative embodiments are described with respect to certain types of machines. The illustrative embodiments are also described with respect to other scenes, subjects, measurements, devices, data processing systems, environments, components, and applications only as examples. Any specific manifestations of these and other similar artifacts are not intended to be limiting to the disclosure. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the disclosure, either locally at a data processing system or over a data network, within the scope of the disclosure. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific surveys, code, hardware, algorithms, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable devices, structures, systems, applications, or architectures therefor, may be used in conjunction with such embodiment of the disclosure within the scope of the disclosure. An illustrative embodiment may be implemented in hardware, software, or a combination thereof.

Example Data Processing Environment

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Client 110, client 112, client 114 are also coupled to network 102. A data processing system, such as clients (e.g., client 110, client 112, client 114), fallout evaluation engine 126, and device 122, may include data and may have software applications or software tools executing thereon. Server 104 and server 106 may include one or more GPUs (graphics processing units) for statistical analysis or machine learning.

Only as an example, and without implying any limitation to such architecture, FIG. 1 depicts certain components that are usable in an example implementation of an embodiment. For example, servers and clients are only examples and not to imply a limitation to a client-server architecture. As another example, an embodiment can be distributed across several data processing systems and a data network as shown, whereas another embodiment can be implemented on a single data processing system, which are all within the scope of the illustrative embodiments.

Data processing systems (fallout evaluation engine 126, server 104, server 106, client 110, client 112, client 114, and device 122) also represent example nodes in a cluster, partitions, and other configurations suitable for implementing an embodiment.

Server 104, server 106, storage unit 108, client 110, client 112, client 114, device 122, fallout evaluation engine 126 may couple to network 102 using wired connections, wireless communication protocols, or other suitable data connectivity. Client 110, client 112 and client 114 may be, for example, personal computers or network computers.

In the depicted example, the servers may provide data, such as boot files, operating system images, and applications to client 110, client 112, and client 114. Client 110, client 112 and client 114 may be clients to servers in this example. Client 110, client 112 and client 114 or some combination thereof, may include their own data, boot files, operating system images, and applications. Data processing environment 100 may include additional servers, clients, and other devices that are not shown. Server 104 may include a server application 116 that may be configured to implement one or more of the functions described herein in accordance with one or more embodiments. Server application 116, client application 124 and/or fallout evaluation engine 126 may include fallout evaluation code 118 configured for evaluating fallouts to improve an efficiency of a ticketing system. In some embodiments, the fallout evaluation engine 126 may be or form a part of a server or client described herein.

Device 122 is an example of a device described herein. For example, device 122 can take the form of a smartphone, a tablet computer, a laptop computer, client 110 in a stationary or a portable form, or any other suitable device. Any software application described as executing in another data processing system in FIG. 1 can be configured to execute in device 122 in a similar manner. Any data or information stored or produced in another data processing system in FIG. 1 can be configured to be stored or produced in device 122 in a similar manner. Database 120 of storage unit 108 may store one or more term data samples for computations herein.

The data processing environment 100 may also be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent business applications. Data processing environment 100 may also take the form of a cloud and employ a cloud computing model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Computing environment 200 includes an example of an environment for the execution of at least some of the computer code involved in performing the inventive methods, such as fallout evaluation code 118. In addition to the fallout evaluation code 118, computing environment 200 includes, for example, Computer 202, wide area network 228 (WAN), end user device 230 (EUD), remote server 232, public cloud 240, and private cloud 236. In this embodiment, Computer 202 includes processor set 204 (including processing circuitry 206 and cache 208), communication fabric 210, volatile memory 212, persistent storage 214 (including operating system 216 and the fallout evaluation code 118, as identified above), peripheral device set 218 (including user interface (UI) device set 220, storage 222, and Internet of Things (IoT) sensor set 224), and network module 226. Remote server 232 includes remote database 234. Public cloud 240 includes gateway 238, cloud orchestration module 242, host physical machine set 246, virtual machine set 244, and container set 248.

Figure 2:
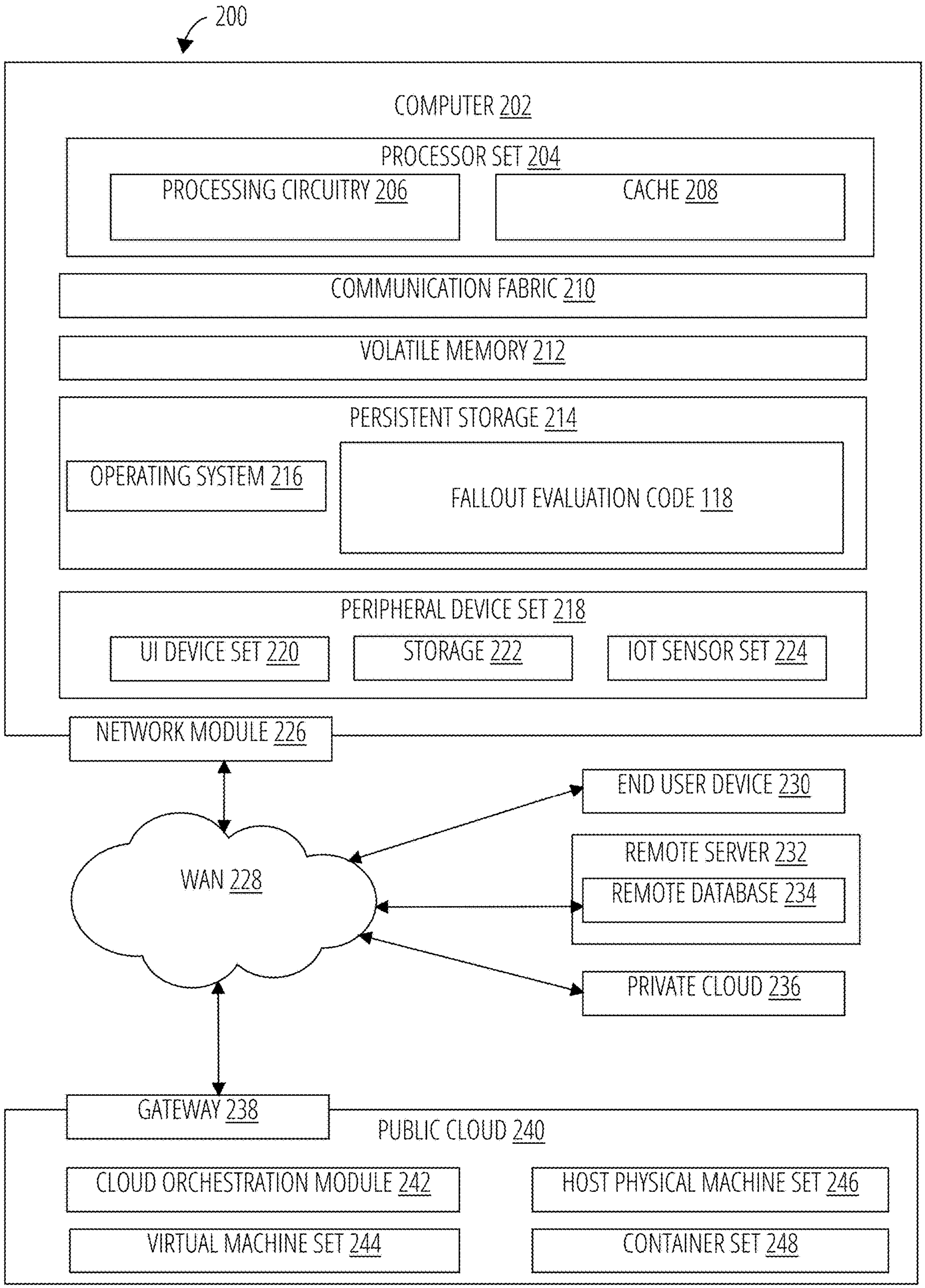
FIG. 2 depicts a block diagram of a computing environment in accordance with an illustrative embodiment.

Computer 202 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 234. As is well understood in the art of computer technology, and depending upon the technology, performance of a computer-implemented method may be distributed among multiple computers and/or between multiple locations. On the other hand, in this presentation of computing environment 200, detailed discussion is focused on a single computer, specifically Computer 202, to keep the presentation as simple as possible. Computer 202 may be located in a cloud, even though it is not shown in a cloud in FIG. 2. On the other hand, Computer 202 is not required to be in a cloud except to any extent as may be affirmatively indicated.

Processor set 204 includes one, or more, computer processors of any type now known or to be developed in the future. Processing circuitry 206 may be distributed over multiple packages, for example, multiple, coordinated integrated circuit chips. Processing circuitry 206 may implement multiple processor threads and/or multiple processor cores. Cache 208 is memory that is located in the processor chip package(s) and is typically used for data or code that should be available for rapid access by the threads or cores running on processor set 204. Cache memories are typically organized into multiple levels depending upon relative proximity to the processing circuitry. Alternatively, some, or all, of the cache for the processor set may be located "off chip." In some computing environments, processor set 204 may be designed for working with qubits and performing quantum computing.

Computer readable program instructions are typically loaded onto Computer 202 to cause a series of operational steps to be performed by processor set 204 of Computer 202 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 208 and the other storage media discussed below. The program instructions, and associated data, are accessed by processor set 204 to control and direct performance of the inventive methods. In computing environment 200, at least some of the instructions for performing the inventive methods may be stored in the fallout evaluation code 118 in persistent storage 214.

Communication fabric 210 is the signal conduction path that allows the various components of Computer 202 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 212 is any type of volatile memory now known or to be developed in the future. Examples include dynamic type random access memory (RAM) or static type RAM. Typically, volatile memory 212 is characterized by random access, but this is not required unless affirmatively indicated. In Computer 202, the volatile memory 212 is located in a single package and is internal to Computer 202, but, alternatively or additionally, the volatile memory may be distributed over multiple packages and/or located externally with respect to Computer 202.

Persistent storage 214 is any form of non-volatile storage for computers that is now known or to be developed in the future. The non-volatility of this storage means that the stored data is maintained regardless of whether power is being supplied to Computer 202 and/or directly to persistent storage 214. Persistent storage 214 may be a read only memory (ROM), but typically at least a portion of the persistent storage allows writing of data, deletion of data and re-writing of data. Some familiar forms of persistent storage include magnetic disks and solid-state storage devices. Operating system 216 may take several forms, such as various known proprietary operating systems or open-source Portable Operating System Interface-type operating systems that employ a kernel. The code included in the fallout evaluation code 118 typically includes at least some of the computer code involved in performing the inventive methods.

Peripheral device set 218 includes the set of peripheral devices of Computer 202. Data communication connections between the peripheral devices and the other components of Computer 202 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 220 may include components such as a display screen, speaker, microphone, wearable devices (such as goggles and smart watches), keyboard, mouse, printer, touchpad, game controllers, and haptic devices. Storage 222 is external storage, such as an external hard drive, or insertable storage, such as an SD card. Storage 222 may be persistent and/or volatile. In some embodiments, storage 222 may take the form of a quantum computing storage device for storing data in the form of qubits. In embodiments where Computer 202 is required to have a large amount of storage (for example, where Computer 202 locally stores and manages a large database) then this storage may be provided by peripheral storage devices designed for storing very large amounts of data, such as a storage area network (SAN) that is shared by multiple, geographically distributed computers. IoT sensor set 224 is made up of sensors that can be used in Internet of Things applications. For example, one sensor may be a thermometer and another sensor may be a motion detector.

Network module 226 is the collection of computer software, hardware, and firmware that allows Computer 202 to communicate with other computers through WAN 228. Network module 226 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 226 are performed on the same physical hardware device. In other embodiments (for example, embodiments that utilize software-defined networking (SDN)), the control functions and the forwarding functions of network module 226 are performed on physically separate devices, such that the control functions manage several different network hardware devices. Computer readable program instructions for performing the inventive methods can typically be downloaded to Computer 202 from an external computer or external storage device through a network adapter card or network interface included in network module 226.

WAN 228 is any wide area network (for example, the internet) capable of communicating computer data over non-local distances by any technology for communicating computer data, now known or to be developed in the future. In some embodiments, the WAN 228 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 230 is any computer system that is used and controlled by an end user (for example, a customer of an enterprise that operates Computer 202) and may take any of the forms discussed above in connection with Computer 202. EUD 230 typically receives helpful and useful data from the operations of Computer 202. For example, in a hypothetical case where Computer 202 is designed to provide a recommendation to an end user, this recommendation would typically be communicated from network module 226 of Computer 202 through WAN 228 to EUD 230. In this way, EUD 230 can display, or otherwise present, the recommendation to an end user. In some embodiments, EUD 230 may be a client device, such as thin client, heavy client, mainframe computer, desktop computer and so on.

Remote server 232 is any computer system that serves at least some data and/or functionality to Computer 202. Remote server 232 may be controlled and used by the same entity that operates Computer 202. Remote server 232 represents the machine(s) that collect and store helpful and useful data for use by other computers, such as Computer 202. For example, in a hypothetical case where Computer 202 is designed and programmed to provide a recommendation based on historical data, then this historical data may be provided to Computer 202 from remote database 234 of remote server 232.

Public cloud 240 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 240 is performed by the computer hardware and/or software of cloud orchestration module 242. The computing resources provided by public cloud 240 are typically implemented by virtual computing environments that run on various computers making up the computers of host physical machine set 246, which is the universe of physical computers in and/or available to public cloud 240. The virtual computing environments (VCEs) typically take the form of virtual machines from virtual machine set 244 and/or containers from container set 248. It is understood that these VCEs may be stored as images and may be transferred among and between the various physical machine hosts, either as images or after instantiation of the VCE. Cloud orchestration module 242 manages the transfer and storage of images, deploys new instantiations of VCEs and manages active instantiations of VCE deployments. Gateway 238 is the collection of computer software, hardware, and firmware that allows public cloud 240 to communicate through WAN 228.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 236 is similar to public cloud 240, except that the computing resources are only available for use by a single enterprise. While private cloud 236 is depicted as being in communication with WAN 228, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 240 and private cloud 236 are both part of a larger hybrid cloud.

Figure 3:
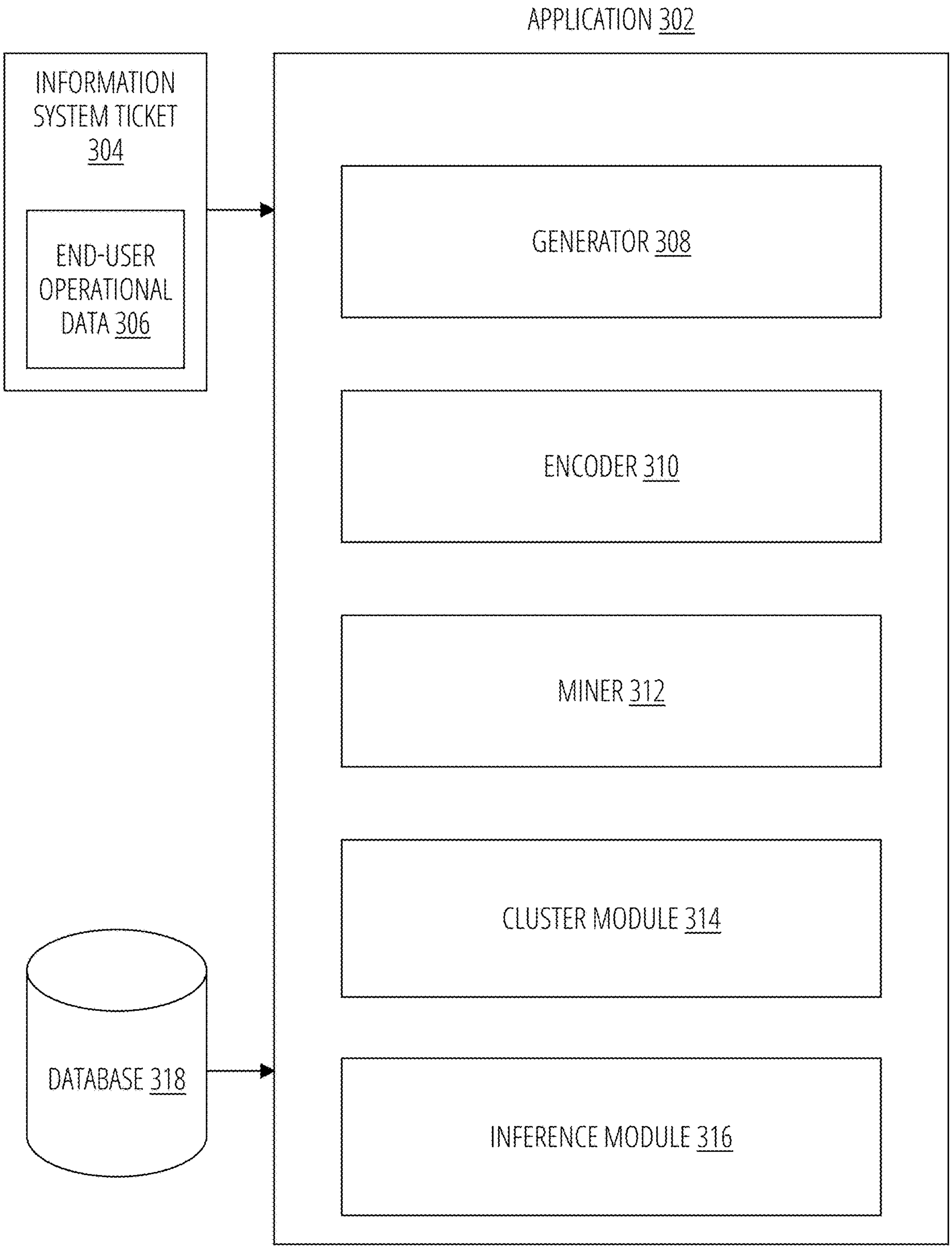
FIG. 3 depicts a block diagram of an application in accordance with an illustrative embodiment.

Reference is now made to FIG. 3 which illustrates an application 302 in accordance with one or more embodiments. The application 302 may be operated based on fallout evaluation code 118 to perform fallout evaluation, inference and/or prediction as discussed herein. The application 302 comprises a generator 308, an encoder 310, a miner 312, a cluster module 314 and an inference module 316.

In an aspect herein, the generator 308 may receive one or more information system tickets 304 that are generated in relation to one or more issues in product pipeline. In an aspect, the information system ticket 304 may represent tickets that are manually or automatically generated in response to a detected issue to be fixed. However, an information system ticket 304 may also represent other forms of information about potential issues to be fixed that may not necessarily be in the form of tickets. For example, the information system ticket 304 may represent snapshots of data about an information system that is taken at regular time intervals. Responsive to receiving the information system ticket 304 the generator generates (for example capture or retrieve), for each information system ticket 304 a first state 402 (see FIG. 4) of data related to the information system ticket 304. This may be performed to capture or retrieve at least an original state of one or more end-user operational data 306 prior to fixing the issue.

Figure 4:
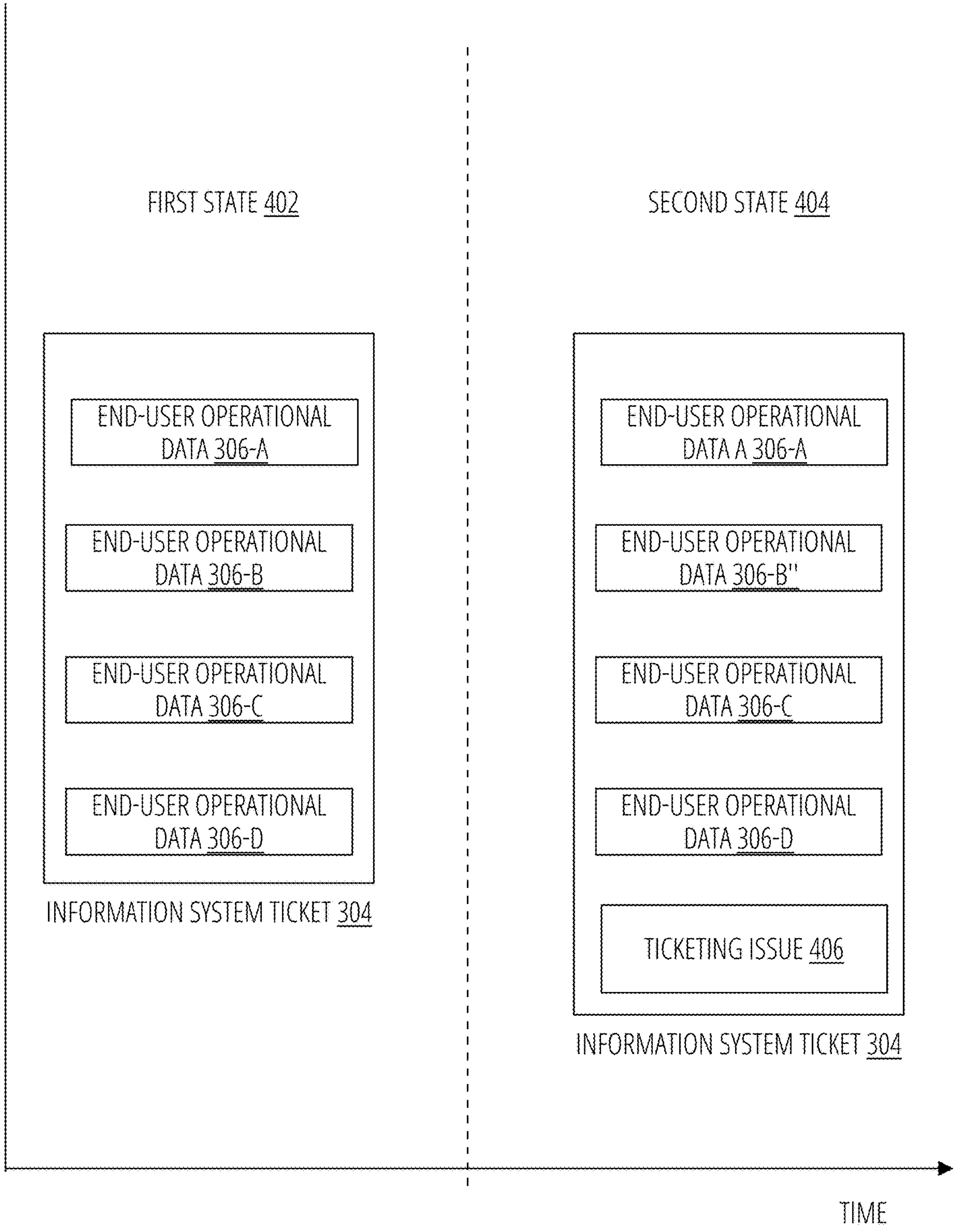
FIG. 4 depicts a block diagram of a first state and a second state showing end-user operational data in accordance with an illustrative embodiment.

The generator 308 may also generate (for example capture or retrieve), for each information system ticket 304 a second state 404 of data related to the information system ticket 304. The generation may be performed to obtain at least a changed state of the one or more end-user operational data 306. In an aspect, the second state 404 is representative of a state of data subsequent to fixing or resolving the issue of the ticket. For example, a first state of data related to an information system ticket 304 may comprise at least end-user operational data 306-A, end-user operational data 306-B, end-user operational data 306-C, and end-user operational data 306-D, and a second state of data related to the information system ticket 304 may comprise at least end-user operational data 306-A, end-user operational data 306-B", end-user operational data 306-C, and end-user operational data 306-D as shown in FIG. 4. Herein end-user operational data 306-B has changed to end-user operational data 306-B". More specifically, end-user operational data 306-A may comprise, for example, an internet speed of 100 Mbps (megabit per second) and end-user operational data 306-B may comprise a transfer protocol of "HTTPS".

Upon ascertaining the ticketing issue 406 to be a mismatch of data related to available combinations of internet speed and transfer protocols, and fixing said ticketing issue 406, "HTTPS" may be changed accordingly to "FTP" (end-user operational data 306-B"), for example, in the second state 404 to resolve the ticketing issue 406. Thus, changes in end-user operational data 306 between snapshots may signify tickets wherein an issue was detected and resolved. Examples may include correcting a mismatch of data between two applications or a mismatch between processes of one application, correcting missing end-user operational data, and correcting wrong end-user operational data.

The first state 402 and the second state 404 of data of a plurality of information system tickets 304 can be stored in a database 318 such as database 120 for use. Capturing the first state 402 and the second state 404 may be performed at regular time intervals or responsive to registering a change to an end-user operational data 306. Of course, the capturing method is not meant to be limiting as other variations of capturing changes may be obtained in view of the descriptions herein.

Turning back to FIG. 3, in some embodiments, the end-user operational data 306 may comprise categorical data, which may be encoded into binary data using encoder 310. More specifically, the encoder 310 may convert categorical data of the first state 402 and second state 404 into binary data for mining by the miner 312. The miner 312 may be configured to mine the database 318 for changes in the one or more end-user operational data 306 between the first state 402 and the second state 404 (via, for example, the binary data) to generate patterns of changes. Particular ticketing issues 406 may thus generate corresponding patterns of changes.

Figure 5:
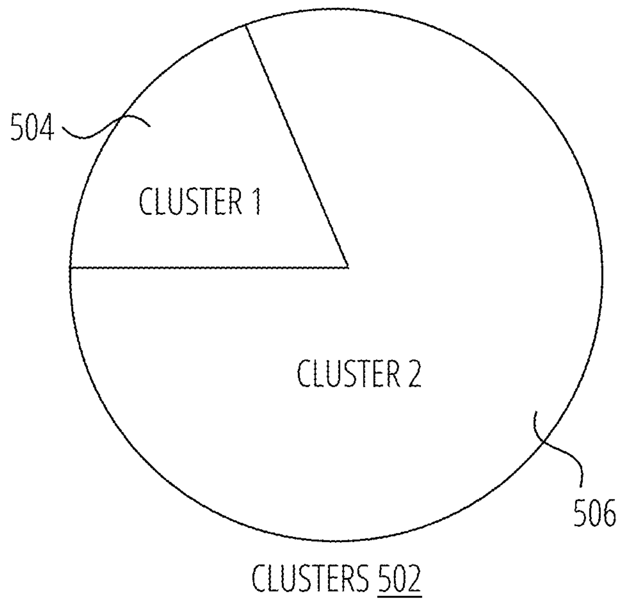
FIG. 5 depicts a chart of clusters in accordance with an illustrative embodiment.

The cluster module 314 is configured to cluster the patterns of changes into a plurality of clusters 502 (see FIG. 5, for example cluster 1 504, and cluster 2 506) wherein each cluster represents a different ticketing issue. In an embodiment, unsupervised clustering may be used. For example, K-means clustering may be used. K-means clustering is a partitioning method used in unsupervised machine learning for clustering data. In the technique, data points may be grouped into k clusters based on their feature similarity. The cluster module 314 may iteratively assigns each data point to the nearest cluster centroid and then recalculate the centroids based on the mean of the data points in the cluster. This process may continue until the centroids no longer change significantly or a predefined number of iterations is reached.

In an aspect, the inference module 316 is used to infer information about an existing ticket by assigning a pattern of end-user operational data changes related to the existing ticket to an existing cluster from the plurality of clusters. By so doing, specific information about ticketing issues 406 that have been resolved may be detectable without knowledge or documentation from an operator about what was resolved. More specifically, inferring the issue may allow the acceleration of a computing process of the information system by observing data mismatches for processes in which the mismatches have already been fixed without having to speak to or garner knowledge from an operator that performed the fix. For example, by retrieving stored first and second states of a ticket to deduce a pattern of change corresponding to the ticket, the inference module 316 can successfully compute that the pattern of change corresponds to an existing cluster and thus infer the issue that was fixed based on a ticketing issue 406 corresponding to the existing cluster. Particularly, human input regarding up-to-date guidance on prior resolved ticketing issues may be obviated by methods and systems described herein.

In another aspect, the inference module 316 may be configured to perform early pattern recognition by detecting or predicting a new ticketing issue based on assigning a new pattern of end-user operational data changes related to a new ticket to a new cluster responsive to determining that the new pattern does not fit into any of the plurality of existing clusters. Responsive to detecting the new pattern, a mitigation action may be performed. For example, responsive to detecting that the new pattern has been detected more than a threshold number of times, an organization-wide mitigation may be performed to reduce computational costs associated with new tickets created in the future for the new ticketing issue. Advantageously, an operator may be alerted to perform the mitigation action, less tickets may be created, less time may be wasted on tickets, and client satisfaction may be increased.

FIG. 6 shows an example ticketing overview 602 of ticketing issues 406 and corresponding number of occurrences 604. The overview may visualize a manually generated pattern of ticketing issues 406 that have occurred and/or disclose a resolution status of the ticketing issues 406. For example, though ticketing issue 1 406-1 occurred 300 times at a first time period, ticketing issue 1 406-1 was subsequently resolved at a third time period 608 and though ticketing issue 2 406-2 occurred 45 times at the first time period 606, ticketing issue 2 406-2 was mostly resolved by the third time period 608. By observing information about the ticketing issue 406, one may deduce a pattern of issues and the timeline for resolving said issues, as well what was changed based on the manually entered information. However, by providing first and second states of the ticketing issues 406 to application 302, information about the ticket, such as what was resolved, may be inferred based on successfully assigning a pattern related to the ticketing issues 406 to an existing cluster from the plurality of clusters.

Even further, in a scenario in which a new ticketing issue 406-4 occurs and exceeds a threshold (e.g., 375) number of occurrences 604, application 302 may autonomously detect and alert an operator about the new pattern by assigning the new ticket to a new cluster responsive to determining that the information about the new ticket does not fit into any of a plurality of previously generated clusters.

Figure 7:
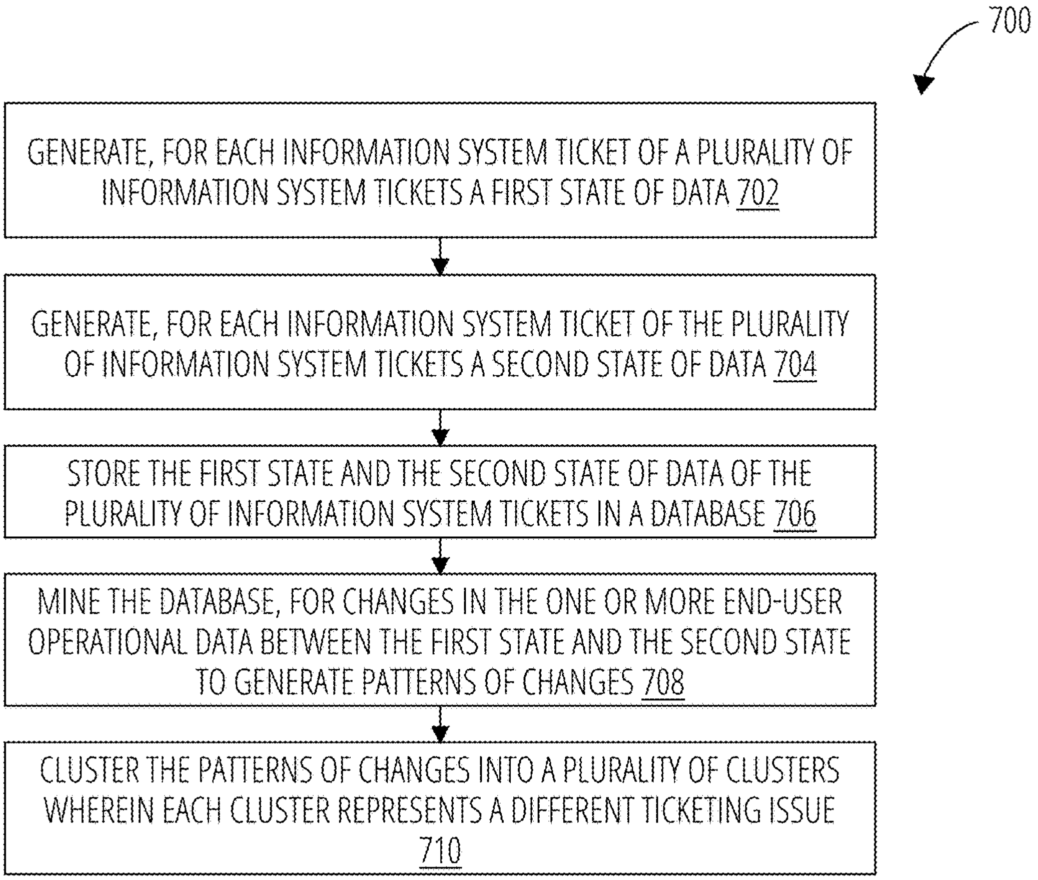
FIG. 7 depicts a routine in accordance with an illustrative embodiment.

FIG. 7 illustrates a routine 700 in accordance with one or more illustrative embodiments. The routine 700 may be performed with fallout evaluation engine 126.

In block 702, fallout evaluation engine 126 generates, for each information system ticket of a plurality of information system tickets a first state of data. The first state corresponds to at least an original state of one or more end-user operational data 306.

In block 704, fallout evaluation engine 126 generates, for each information system ticket of the plurality of information system tickets a second state of data, to capture at least a changed state of the one or more end-user operational data 306.

In block 706, fallout evaluation engine 126 stores the first state 402 and the second state 404 of data in a database.

In block 708, fallout evaluation engine 126 mines the database for changes in the one or more end-user operational data 306 between the first state 402 and the second state 404 to generate patterns of changes.

In block 710, fallout evaluation engine 126 clusters the patterns of changes into a plurality of clusters wherein each cluster represents a different ticketing issue.

In an aspect, the information system ticket is generated by an information system comprising one application and the database is mined for changes in the one or more end-user operational data between the first state 402 corresponding the one application and the second state 404 corresponding to the one application.

In another aspect, the information system ticket is generated by an information system comprising at least two applications, and the database is mined for changes in the one or more end-user operational data between the first state 402 corresponding to a first application and the second state 404 corresponding to a second application. In an example, the second application may be changed such that an end-user operational data 306 related to the second application changes. However, the first application may comprise an original state of the end-user operational data 306. By tracking changes in end-user operational data 306 across applications, early fallouts in systems comprising a plurality of applications may be detected and handled as needed.

Conclusion

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits, and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method, comprising:

generating, for each information system ticket of a plurality of information system tickets, a first state of data corresponding to at least an original state of one or more end-user operational data;

generating, for each information system ticket of the plurality of information system tickets, a second state of data corresponding to at least a changed state of the one or more end-user operational data, wherein the changed state is generated based on a resolution of a respective information system ticket of the plurality of information system tickets;

storing, in a database, the first state of data of each information system ticket of the plurality of information system tickets and the second state of data of each information system ticket of the plurality of information system tickets;

mining the database for changes in the one or more end-user operational data between the first state and the second state to generate patterns of changes;

clustering, via an unsupervised machine learning method, the patterns of changes into a plurality of clusters, wherein each cluster of the plurality of clusters represents a different ticketing issue associated with the plurality of information system tickets;

determining a new pattern of operational data changes related to a new ticket does not fit into the plurality of clusters;

detecting, based on the determining that the new pattern of operational data changes does not fit into the plurality of clusters, a new ticketing issue by assigning the new pattern of operational data changes to a new cluster;

controlling execution of a mitigation action to resolve the new ticketing issue by detecting the new pattern of operational data changes, that does not fit into the plurality of clusters, to exceed a predetermined threshold of occurrences; and inferring information about an existing ticket of the plurality of information system tickets based on successfully assigning a pattern of operational data changes related to the existing ticket, to an existing cluster from the plurality of clusters.

2. The computer-implemented method of claim 1, wherein the detecting of the new ticketing issue is performed automatically.

3. The computer-implemented method of claim 1, wherein the one or more end-user operational data comprises categorical data.

4. The computer-implemented method of claim 3, further comprising converting the categorical data of the first state of data and the second state of data into binary data prior to the mining of the database for the changes in the one or more end-user operational data.

5. The computer-implemented method of claim 1, wherein:

an information system ticket of the plurality of information system tickets is generated by an information system comprising one application; and the database is mined for the changes in the one or more end-user operational data between the first state of data corresponding to the one application and the second state of data corresponding to the one application.

6. The computer-implemented method of claim 1, wherein:

an information system ticket of the plurality of information system tickets is generated by an information system comprising at least two applications; and the database is mined for the changes in the one or more end-user operational data between the first state of data corresponding to a first application of the at least two applications and the second state of data corresponding to a second application of the at least two applications.

7. The computer-implemented method of claim 1, wherein the resolution of the respective information system ticket corresponds to changing of a first transfer protocol of the one or more end-user operational data to a second transfer protocol of the one or more end-user operational data, and wherein the second transfer protocol is different from the first transfer protocol.

8. The computer-implemented method of claim 1, wherein the respective information system ticket represents snapshots of the one or more end-user operational data taken at regular time intervals.

9. A computer program product, comprising:

one or more computer-readable storage devices; and program instructions stored on at least one of the one or more computer-readable storage devices to perform operations comprising:

generating, for each information system ticket of a plurality of information system tickets, a first state of data corresponding to at least an original state of one or more end-user operational data;

generating, for each information system ticket of the plurality of information system tickets, a second state of data corresponding to at least a changed state of the one or more end-user operational data, wherein the changed state is generated based on a resolution of a respective information system ticket of the plurality of information system tickets;

storing, in a database, the first state of data of each information system ticket of the plurality of information system tickets and the second state of data of of each information system ticket of the plurality of information system tickets;

mining the database for changes in the one or more end-user operational data between the first state and the second state to generate patterns of changes;

clustering, via an unsupervised machine learning method, the patterns of changes into a plurality of clusters, wherein each cluster of the plurality of clusters represents a different ticketing issue associated with the plurality of information system tickets;

determining a new pattern of operational data changes related to a new ticket does not fit into the plurality of clusters;

detecting, based on the determination that the new pattern of operational data changes does not fit into the plurality of clusters, a new ticketing issue by assigning the new pattern of operational data changes to a new cluster;

controlling execution of a mitigation action to resolve the new ticketing issue by detecting the new pattern of operational data changes, that does not fit into the plurality of clusters, to exceed a predetermined threshold of occurrences; and inferring information about an existing ticket of the plurality of information system tickets based on successfully assigning a pattern of operational data changes related to the existing ticket, to an existing cluster from the plurality of clusters.

10. The computer program product of claim 9, wherein the operations further comprise detecting the new ticketing issue automatically.

11. The computer program product of claim 9, wherein the operations further comprise converting categorical data of the first state of data and the second state of data into binary data prior to the mining of the database for the changes in the one or more end-user operational data.

12. A non-transitory computer readable storage medium tangibly embodying a computer readable program code having computer readable instructions that, when executed, causes a computer system to:

generate, for each information system ticket of a plurality of information system tickets, a first state of data corresponding to at least an original state of one or more end-user operational data;

generate, for each information system ticket of the plurality of information system tickets, a second state of data corresponding to at least a changed state of the one or more end-user operational data, wherein the changed state is generated based on a resolution of a respective information system ticket of the plurality of information system tickets;

store, in a database, the first state of data of each information system ticket of the plurality of information system tickets and the second state of data of each information system ticket of the plurality of information system tickets;

mine the database for changes in the one or more end-user operational data between the first state and the second state to generate patterns of changes;

cluster, via an unsupervised machine learning method, the patterns of changes into a plurality of clusters, wherein each cluster of the plurality of clusters represents a different ticketing issue associated with the plurality of information system tickets;

determine a new pattern of operational data changes related to a new ticket does not fit into the plurality of clusters;

detect, based on the determination that the new pattern of operational data changes does not fit into the plurality of clusters, a new ticketing issue by assignment of the new pattern of operational data changes to a new cluster;

control execution of a mitigation action to resolve the new ticketing issue by detection of the new pattern of operational data changes, that does not fit into the plurality of clusters, to exceed a predetermined threshold of occurrences; and infer information about an existing ticket of the plurality of information system tickets based on successfully assigning a pattern of operational data changes related to the existing ticket to an existing cluster from the plurality of clusters.

13. The non-transitory computer readable storage medium of claim 12, wherein the computer readable instructions further cause the computer system to:

convert categorical data of the first state of data and the second state of data into binary data prior to the mining of the database for the changes in the one or more end-user operational data.

* * * * *